(12) United States Patent
Hanaoka

(10) Patent No.: US 10,336,374 B2
(45) Date of Patent: Jul. 2, 2019

(54) VEHICLE REAR PORTION STRUCTURE

(71) Applicant: TOYOTA JIDOSHA KABUSHIKI KAISHA, Toyota-shi, Aichi-ken (JP)

(72) Inventor: Yusuke Hanaoka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 15/710,218

(22) Filed: Sep. 20, 2017

(65) Prior Publication Data

US 2018/0127030 A1 May 10, 2018

(30) Foreign Application Priority Data

Nov. 8, 2016 (JP) .................................. 2016-218451

(51) Int. Cl.
*B60K 37/00* (2006.01)
*B62D 25/02* (2006.01)
(Continued)

(52) U.S. Cl.
CPC ........... *B62D 25/025* (2013.01); *B62D 25/08* (2013.01); *B62D 25/2027* (2013.01); *B62D 25/2036* (2013.01)

(58) Field of Classification Search
CPC . B60G 17/04; B60R 13/0206; B60R 13/0212; B60R 2013/0281;
(Continued)

(56) References Cited

U.S. PATENT DOCUMENTS 6,830,287 B1 * 12/2004 Aghssa ................ B62D 25/087
280/784
7,644,978 B2 * 1/2010 Tosaka ................ B62D 21/157
296/187.08
(Continued)

FOREIGN PATENT DOCUMENTS

JP    H01-130886 U    9/1989
JP    H02-44578 U     3/1990
(Continued)

OTHER PUBLICATIONS

May 14, 2019 Office Action issued in Japanese Patent Application No. 2016-218451.

*Primary Examiner* — Kiran B Patel
(74) *Attorney, Agent, or Firm* — Oliff PLC

(57) ABSTRACT

A vehicle rear portion structure has: a rocker disposed at a vehicle transverse direction outer side of a floor portion of a vehicle body, and extending in a vehicle longitudinal direction as seen from a vehicle vertical direction; a rear side member having a front portion, which is disposed at a vehicle transverse direction inner side of the rocker and is disposed at a position overlapping the rocker as seen from a vehicle transverse direction, and a rear portion, which extends from the front portion toward a vehicle rear side and extends in the vehicle longitudinal direction as seen from the vehicle vertical direction; and a closed cross-section structural portion that is structured to include a portion of the rocker and a portion of the front portion, that is interposed between the rocker and the front portion, and that extends in the vehicle longitudinal direction.

4 Claims, 6 Drawing Sheets

(51) Int. Cl.
  *B62D 25/08* (2006.01)
  *B62D 25/20* (2006.01)

(58) Field of Classification Search
  CPC . B60R 2013/0293; B60P 3/08; G07B 15/063; B62D 1/28; G01S 13/931; G01C 21/28
  USPC ...................................... 296/203.03, 203.04
  See application file for complete search history.

(56) References Cited

U.S. PATENT DOCUMENTS

| | | | | |
|---|---|---|---|---|
| 8,899,667 | B2* | 12/2014 | Okamachi | B62D 25/08 296/203.04 |
| 8,926,006 | B2* | 1/2015 | Mildner | B62D 25/2009 296/193.07 |
| 9,422,010 | B2* | 8/2016 | Boettcher | B62D 33/023 |
| 2005/0082876 | A1* | 4/2005 | Akasaka | B62D 21/152 296/203.01 |
| 2005/0082878 | A1* | 4/2005 | Yamada | B62D 21/09 296/204 |
| 2009/0001767 | A1* | 1/2009 | Yamaguchi | B60K 15/063 296/203.04 |
| 2010/0052368 | A1* | 3/2010 | Yamaguchi | B62D 25/087 296/203.04 |
| 2013/0118824 | A1* | 5/2013 | Maeda | B62D 21/157 180/68.5 |
| 2016/0059892 | A1* | 3/2016 | Lee | B62D 21/152 296/187.09 |
| 2016/0244098 | A1* | 8/2016 | Kanemori | B62D 21/152 |
| 2017/0088189 | A1* | 3/2017 | Saeki | B62D 21/03 |
| 2017/0106912 | A1* | 4/2017 | Matsuura | B62D 27/065 |

FOREIGN PATENT DOCUMENTS

| | | |
|---|---|---|
| JP | H05-162661 A | 6/1993 |
| JP | 2010-179898 A | 8/2010 |
| JP | 2014-169030 A | 9/2014 |

* cited by examiner

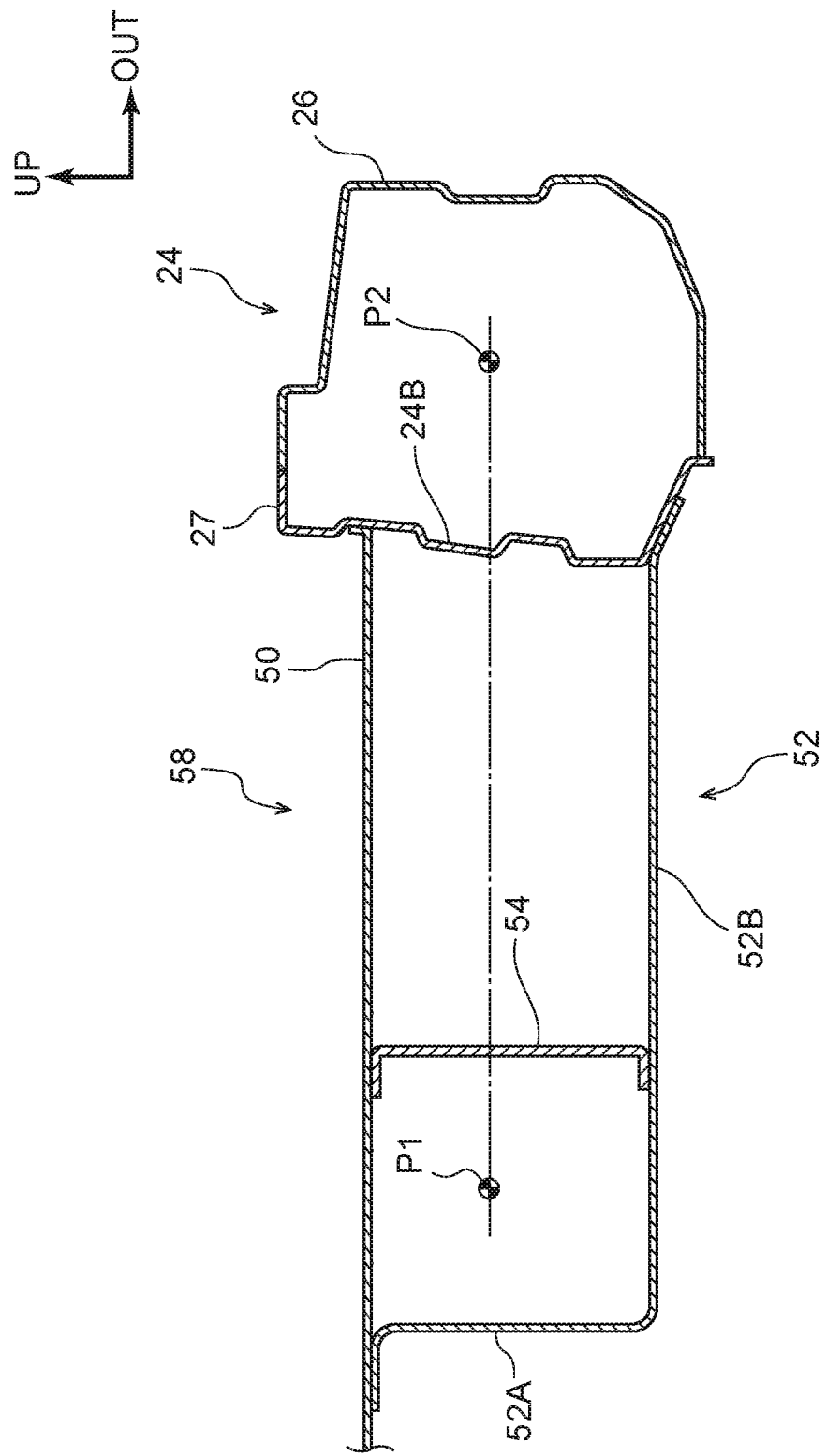

VEHICLE REAR PORTION STRUCTURE

CROSS-REFERENCE TO RELATED APPLICATION

This application claims priority under 35 USC 119 from Japanese Patent Application No. 2016-218451, filed Nov. 8, 2016, the disclosure of which is incorporated by reference herein.

BACKGROUND

Technical Field

The present invention relates to a vehicle rear portion structure.

Related Art

An invention relating to a rear portion vehicle body structure of a vehicle is disclosed in Japanese Patent Application Laid-Open (JP-A) No. 2010-179898. In this rear portion vehicle body structure of a vehicle, the welded surfaces of a vehicle transverse direction outer side wall portion that structures the front portion of a rear side member, and a rear side wall portion of a rocker inner panel, are inclined in a direction orthogonal to the axis of the front portion of the rear side member. Therefore, the opening width of the front end portion of the rear side member and the rocker inner panel can substantially be made to be wide with respect to the welding direction of the spot welding. As a result, a welding gun can be easily inserted between the rear side member and the rocker inner panel, and the pitch of the spot welding of these members can be narrow.

However, in JP-A No. 2010-179898, the vehicle transverse direction inner side wall portion at the front portion of the rear side member is gently curved toward the vehicle transverse direction outer side. Therefore, it is thought that, when collision load is inputted to the rear side member due to a collision of a collision body with the vehicle rear surface (hereinafter simply called "rear collision"), a moment will arise at the front portion of the rear side member. Further, it is thought that stress will concentrate at the joined portion of the rear side member and the rocker due to the stress generated by this moment, and that the fixed state of the rear side member to the rocker will be released.

SUMMARY

The present invention provides a vehicle rear portion structure that can suppress releasing of the fixed state of a rear side member to a rocker due to collision load that is due to a rear collision.

A vehicle rear portion structure of a first aspect of the present invention has: a rocker that is disposed at a vehicle transverse direction outer side of a floor portion of a vehicle body, and that extends in a vehicle longitudinal direction as seen from a vehicle vertical direction; a rear side member that has a front portion, which is disposed at a vehicle transverse direction inner side of the rocker and is disposed at a position overlapping the rocker as seen from a vehicle transverse direction, and a rear portion, which extends from the front portion toward a vehicle rear side and extends in the vehicle longitudinal direction as seen from the vehicle vertical direction; and a closed cross-section structural portion that is structured to include a portion of the rocker and a portion of the front portion, that is interposed between the rocker and the front portion, and extends in the vehicle longitudinal direction, and that has a closed whose cross-sectional shape seen from the vehicle longitudinal direction.

In accordance with the first aspect, the rocker is disposed at the vehicle transverse direction outer side of the floor portion of the vehicle body, and the rocker extends in the vehicle longitudinal direction as seen from the vehicle vertical direction. The rear side member is disposed at the vehicle transverse direction inner side of the rocker. The front portion of the rear side member is disposed at a position overlapping the rocker as seen from the vehicle transverse direction. On the other hand, the rear portion of the rear side member extends toward the vehicle rear side from the front portion, and extends in the vehicle longitudinal direction as seen from the vehicle vertical direction.

By the way, in a case in which the front portion of the rear side member is a structure that is curved toward the vehicle transverse direction outer side and joined to the rocker, it is thought that, when collision load due to a rear collision is inputted to the rear side member, a moment due to this collision load will arise at the front portion. Further, it is thought that stress will concentrate at the joined portion of the front portion and the rocker due to the stress generated by this moment, and that the fixed state of the rear side member to the rocker will be released.

Here, in the present invention, the closed cross-section structural portion, which extends in the vehicle longitudinal direction and which has a closed cross-sectional shape seen from the vehicle longitudinal direction, is structured to include a portion of the rocker and a portion of the front portion. This closed cross-section structural portion is interposed between the rocker and the front portion. Therefore, collision load that is due to a rear collision and is inputted to the rear side member can be received by the axial forces of the rear side member, the closed cross-section structural portion and the rocker, and a moment, which is due to this collision load, being applied between the rear side member and the rocker can be suppressed. Accordingly, there is the excellent effect that the fixed state of the rear side member to the rocker being released due to the collision load that is due to a rear collision can be suppressed.

In a vehicle rear portion structure of a second aspect of the present invention, in the first aspect, the rear portion extends rectilinearly in the vehicle longitudinal direction as seen from the vehicle transverse direction, and the front portion extends at an incline with respect to the vehicle longitudinal direction as seen from the vehicle transverse direction, and the rocker has an inclined portion that extends at an incline with respect to the vehicle longitudinal direction so as to overlap the front portion as seen from the vehicle transverse direction, and a vehicle vertical direction position of a shear center of the front portion in a cross-section seen from the vehicle longitudinal direction, and a vehicle vertical direction position of a shear center of the inclined portion in a cross-section seen from the vehicle longitudinal direction, are a same position.

In accordance with the second aspect, the rear portion of the rear side member extends rectilinearly in the vehicle longitudinal direction as seen from the vehicle transverse direction. The front portion of this rear side member extends at an incline with respect to the vehicle longitudinal direction as seen from the vehicle transverse direction. Therefore, a step can be provided at the floor portion of the vehicle body.

By the way, in a case in which the rear side member is structured as described above, it is thought that, when collision load due to a rear collision is inputted to the rear side member, a bending moment, which bends the rear side member in the vehicle vertical direction, will arise at the inflection point of the front portion and the rear portion.

Here, in the present invention, the rocker has the inclined portion, and this inclined portion extends at an incline with respect to the vehicle longitudinal direction so as to overlap the front portion as seen from the vehicle transverse direction. Further, the vehicle vertical direction position of the shear center of the front portion of the rear side member in a cross-section seen from the vehicle longitudinal direction, and the vehicle vertical direction position of the shear center of the inclined portion of the rocker in a cross-section seen from the vehicle longitudinal direction, are set to the same position. Note that the "shearing position" means, when load in the vehicle vertical direction is applied to an above-described structural element of the vehicle body, the point of application of shearing force within the cross-section of that structural element which is such that torsional deformation does not arise at that cross-section. Further, "same position" here includes not only a state in which the vehicle vertical direction positions are exactly the same, but also states in which the vehicle vertical direction positions are offset slightly in the vehicle vertical direction.

Therefore, as compared with a structure in which a bending moment in the vehicle vertical direction, which arises due to collision load that is due to a rear collision, is supported only by the rear side member, the rear side member bending due to this bending moment can be suppressed in the present invention. Accordingly, there is the excellent effect that, at the time of input of collision load that is due to a rear collision, the rear side member can be supported in a stable state.

In a vehicle rear portion structure of a third aspect of the present invention, in the first aspect, vehicle upper side portions of the rear side member and the closed cross-section structural portion are structured by a portion of a floor panel that is provided at the floor portion, and a lower panel, which is structured to include an inner-side side wall portion that structures a vehicle transverse direction inner side portion of the rear side member, a bottom wall portion that structures vehicle lower side portions of the rear side member and the closed cross-section structural portion, and an outer-side side wall portion that structures a vehicle transverse direction outer side portion of the rear portion, is disposed at a vehicle lower side of the floor panel, and a vertical wall portion, which structures a portion of the front portion and a portion of the closed cross-section structural portion and which structures a boundary wall portion of the front portion and the closed cross-section structural portion, is disposed on a line of extension of the outer-side side wall portion at a vehicle front side of the outer-side side wall portion as seen from the vehicle vertical direction.

In accordance with the third aspect, the vehicle upper side portions of the rear side member and the closed cross-section structural portion are structured by a portion of the floor panel that is provided at the floor portion. On the other hand, the lower panel is disposed at the vehicle lower side of the floor panel. Further, the vehicle transverse direction inner side portion of the rear side member is structured by the inner-side side wall portion of the lower panel. The vehicle lower side portions of the rear side member and the closed cross-section structural portion are structured by the bottom wall portion of the lower panel. Moreover, the vehicle transverse direction outer side portion of the rear portion of the rear side member is structured by the outer-side side wall portion of the lower panel.

In addition, in the present invention, the vertical wall portion, which structures a portion of the front portion and a portion of the closed cross-section structural portion and which structures a boundary wall portion of the front portion and the closed cross-section structural portion, is disposed on a line of extension of the outer-side side wall portion at a vehicle front side of the outer-side side wall portion as seen from the vehicle vertical direction.

Therefore, in the present invention, the rear side member and the closed cross-section structural portion can be structured by a common member. Accordingly, there is the excellent effect that the numbers of the members that structure the rear side member and the closed cross-section structural portion can be made to be small.

BRIEF DESCRIPTION OF THE DRAWINGS

Exemplary embodiments of the present invention will be described in detail based on the following figures, wherein:

FIG. 6 is an enlarged sectional view that is seen from the vehicle front side and shows the structure of main portions of the vehicle body of the vehicle to which the vehicle rear portion structure relating to the second embodiment is applied (a cross-sectional view showing the state cut along line 6-6 of FIG. 5).

DETAILED DESCRIPTION

First Embodiment

A first embodiment of a vehicle rear portion structure relating to the present invention is described hereinafter by using FIG. 1 through FIG. 4. Note that arrow FR that is shown appropriately in the respective drawings indicates the vehicle forward side, arrow UP indicates the vehicle upward side, and arrow OUT indicates a vehicle transverse direction outer side.

Figure 3:
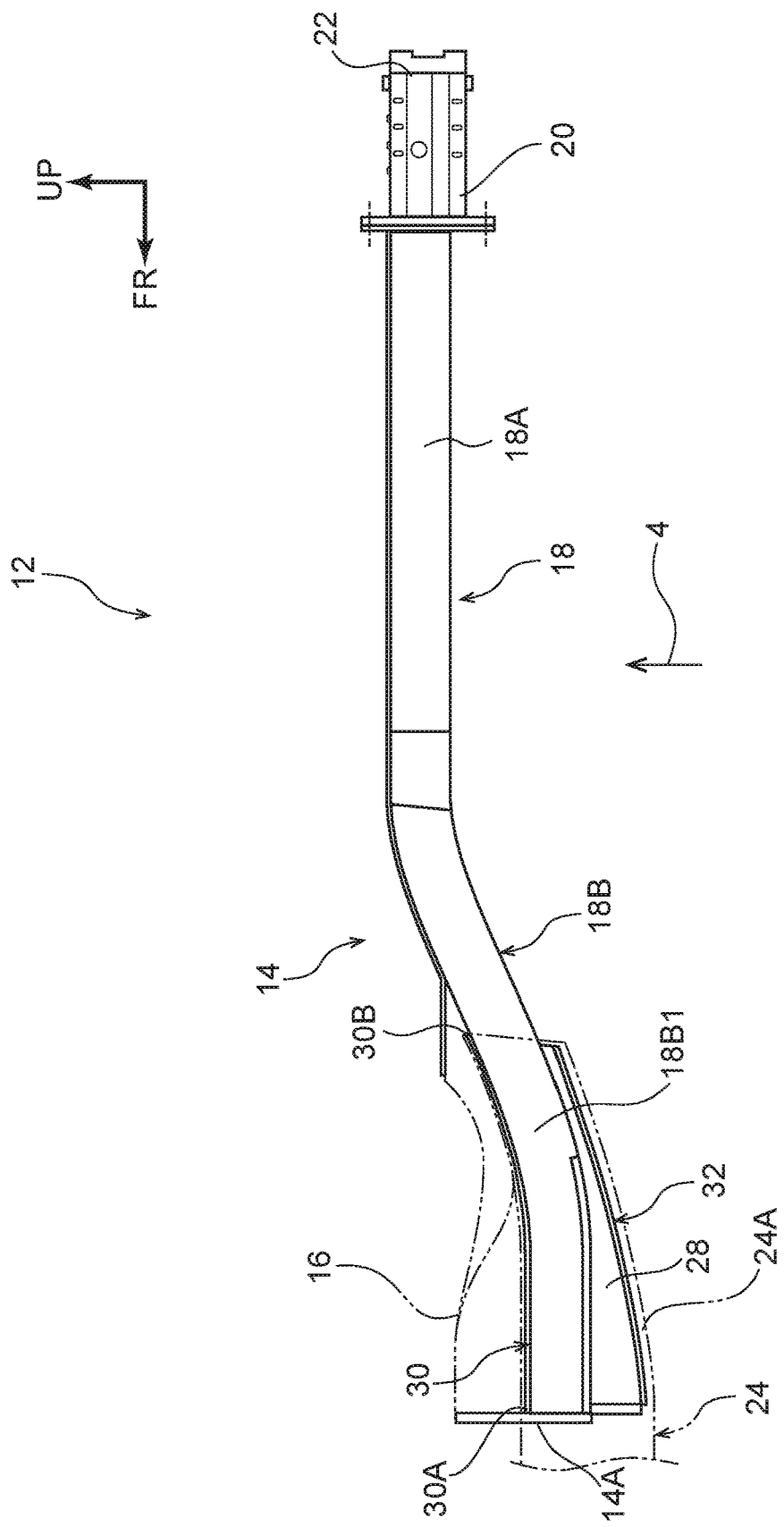
FIG. 3 is a side view that is seen from a vehicle transverse direction outer side and shows the structure of a floor portion of the vehicle to which the vehicle rear portion structure relating to the first embodiment is applied (a view seen in the direction of arrow 3 in FIG. 4)

First, the schematic structure of a "vehicle 10" to which the vehicle rear portion structure relating to the present embodiment is applied is described by using FIG. 3 and FIG.

4. Note that, in the present embodiment, the vehicle 10 is structured so as to basically have left-right symmetry, and therefore, in the following description, explanation is given mainly of the structures of the portions at the vehicle transverse direction left side of the vehicle 10, and description of the structures of the portions at the vehicle transverse direction right side is omitted as appropriate.

The vehicle 10 has a "vehicle body 12". The vehicle body 12 structures a portion of a "floor portion 14" that is at the vehicle lower side of the vehicle body 12, and has a floor panel 16 that extends in the vehicle longitudinal direction and the vehicle transverse direction as seen from the vehicle vertical direction. The floor panel 16 is formed by press working a steel sheet.

Figure 2:
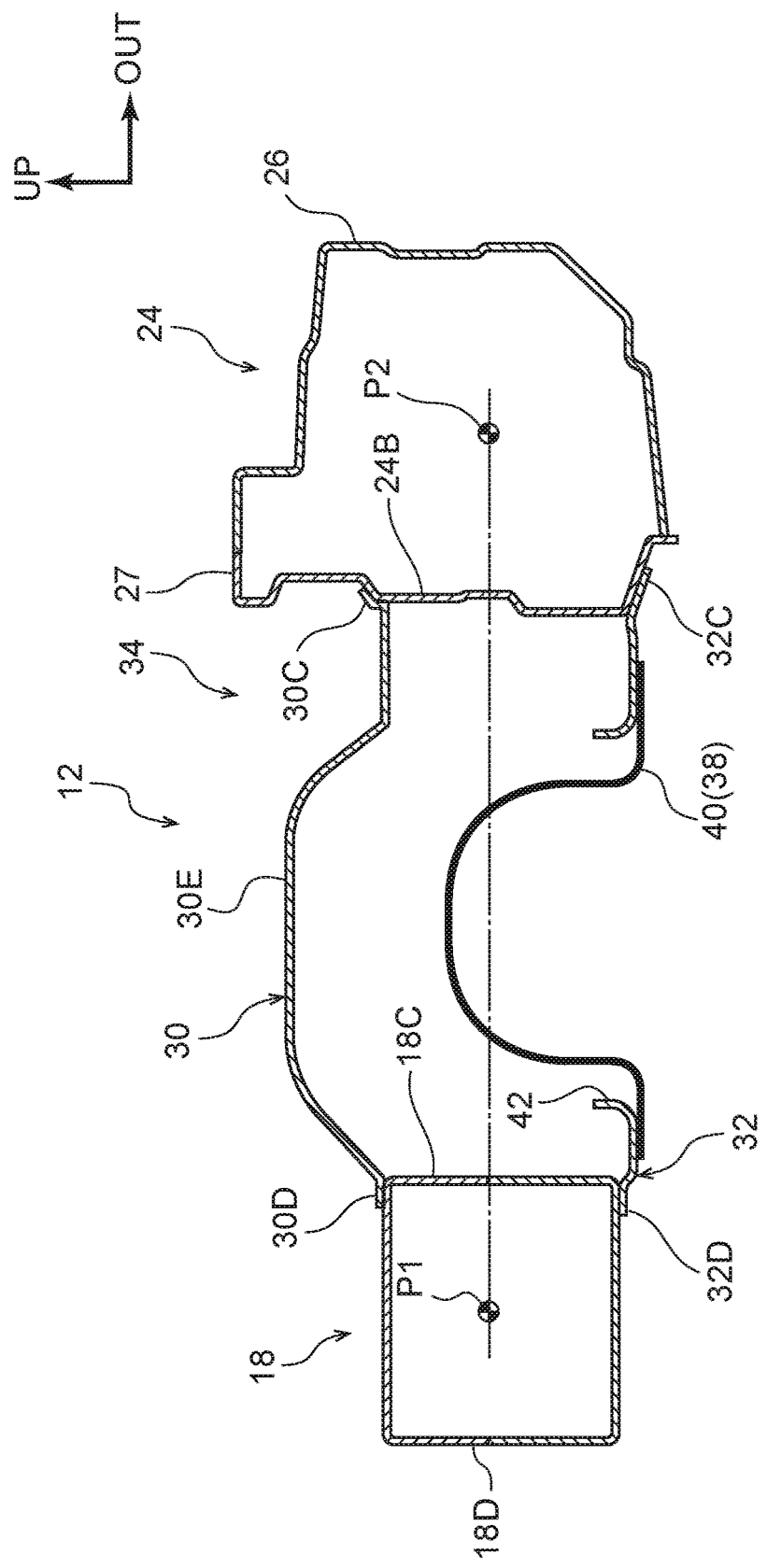
FIG. 2 is an enlarged sectional view that is seen from the vehicle front side and shows the structure of main portions of the vehicle body of the vehicle to which the vehicle rear portion structure relating to the first embodiment is applied (a cross-sectional view showing the state cut along line 2-2 of FIG. 4)

A left-and-right pair of "rear side members 18" that are made of steel are disposed at the vehicle transverse direction outer sides of the floor panel 16 along the peripheral edge portions of the vehicle transverse direction outer sides of the floor panel 16. These rear side members 18 extend in the vehicle longitudinal direction as seen from the vehicle vertical direction. As shown in FIG. 2 as well, basically, the cross-sectional shape of the rear side member 18 as seen from the vehicle longitudinal direction is the shape of a rectangular pillar.

The rear side member 18 has a "rear portion 18A" that extends rectilinearly in the vehicle longitudinal direction as seen from the vehicle transverse direction, and a "front portion 18B" that extends from the rear portion 18A toward the vehicle front side and extends at an incline in the vehicle longitudinal direction as seen from the vehicle transverse direction. Note that the front portion 18B extends toward the vehicle frontward and lower side from the rear portion 18A. Further, a crash box 20 is mounted to the vehicle rear side end portion of the rear portion 18A. A bumper reinforcement 22 spans between the crash boxes 20.

Figure 1:
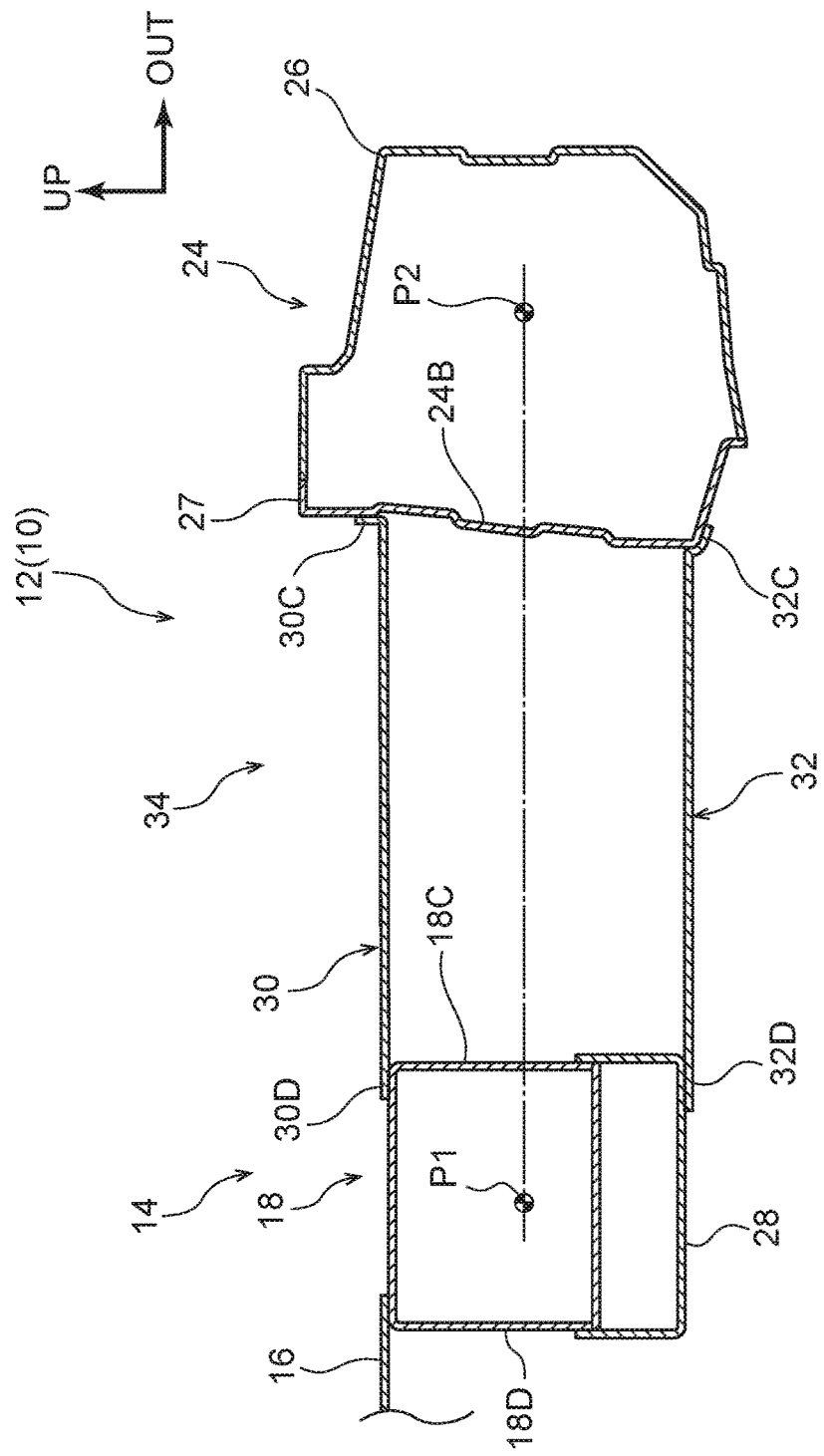
FIG. 1 is an enlarged sectional view that is seen from a vehicle front side and shows the structure of main portions of a vehicle body of a vehicle to which a vehicle rear portion structure relating to a first embodiment is applied (a cross-sectional view showing the state cut along line 1-1 of FIG. 4)

As shown in FIG. 1 as well, the peripheral edge portions at the vehicle transverse direction outer sides of the floor panel 16 are superposed from the vehicle upper side on the peripheral edge portions at the vehicle transverse direction inner sides of the rear side members 18, and are joined thereto at unillustrated joining portions formed by welding or the like. Further, due to the rear side members 18 being structured as described above, the vehicle rear side portion of the floor panel 16 is disposed further toward the vehicle upper side than the vehicle front side portion of the floor panel 16.

On the other hand, "rockers 24", which are made of steel and extend in the vehicle longitudinal direction as seen from the vehicle vertical direction, are disposed at the vehicle transverse direction outer sides of the floor portion 14. As shown in FIG. 1 as well, the rocker 24 is structured to include a rocker outer 26 that structures the vehicle transverse direction outer side portion thereof, and a rocker inner 27 that structures the vehicle transverse direction inner side portion thereof.

In detail, the rocker outer 26 is structured such that the cross-sectional shape thereof, as seen from the vehicle longitudinal direction, is a U-shape whose vehicle transverse direction inner side is open. On the other hand, the rocker inner 27 is basically a structure that is symmetrical to the rocker outer 26 with respect to an axis extending along the vehicle vertical direction, and is structured such that the cross-sectional shape thereof, as seen from the vehicle longitudinal direction, is a U-shape whose vehicle transverse direction outer side is open. A closed cross-sectional structure, whose cross-sectional shape seen from the vehicle longitudinal direction is a rectangular closed cross-section, is structured due to the rocker outer 26 and the rocker inner 27 being joined at unillustrated joining portions formed by welding or the like.

The rocker 24 has an inclined portion 24A that extends at an incline with respect to the vehicle longitudinal direction, so as to overlap the front portion 18B of the rear side member 18 as seen from the vehicle transverse direction. The cross-section of this inclined portion 24A broadens in the vehicle vertical direction while heading toward the vehicle front side. On the other hand, an extension 28 is provided at the portion of the front portion 18B, which portion overlaps the inclined portion 24A as seen from the vehicle transverse direction (hereinafter, this portion is called overlapping portion 18B1), at the vehicle lower side of the overlapping portion 18B1. As shown in FIG. 1 as well, the cross-sectional shape seen from the vehicle longitudinal direction of this extension 28 is structured in a U-shape whose vehicle upper side is open. The extension 28 is provided along the overlapping portion 18B1, except for at a predetermined section of the vehicle rear side of the overlapping portion 18B1.

The cross-sectional shape, as seen from the vehicle longitudinal direction, of the extension 28 is set such that a vehicle vertical direction position of "shear center P1" of the cross-section of the front portion 18B as seen from the vehicle longitudinal direction, and a vehicle vertical direction position of "shear center P2" of the cross-section of the inclined portion 24A as seen from the vehicle longitudinal direction, are the same position. Note that "same position" here includes not only a state in which the vehicle vertical direction positions are exactly the same, but also states in which the vehicle vertical direction positions are offset slightly in the vehicle vertical direction. Further, the vehicle vertical direction dimension of the cross-section of the place, at which the extension 28 is not provided, of the overlapping portion 18B1 is the same extent as the vehicle vertical direction dimension of the cross-section of the corresponding inclined portion 24A. Therefore, at this place as well, the vehicle vertical direction position of the shear center P1 and the vehicle vertical direction position of the shear center P2 are the same position.

Here, in the present embodiment, there is a feature in the point that a "closed cross-section structural portion 34", which is interposed between the front portion 18B and the rocker 24, is provided so as to include a portion of the front portion 18B of the rear side member 18, a portion of the rocker 24, an upper panel 30, and a lower panel 32. The structure of the closed cross-section structural portion 34 that structures a main portion of the present embodiment is described in detail hereinafter.

Figure 4:
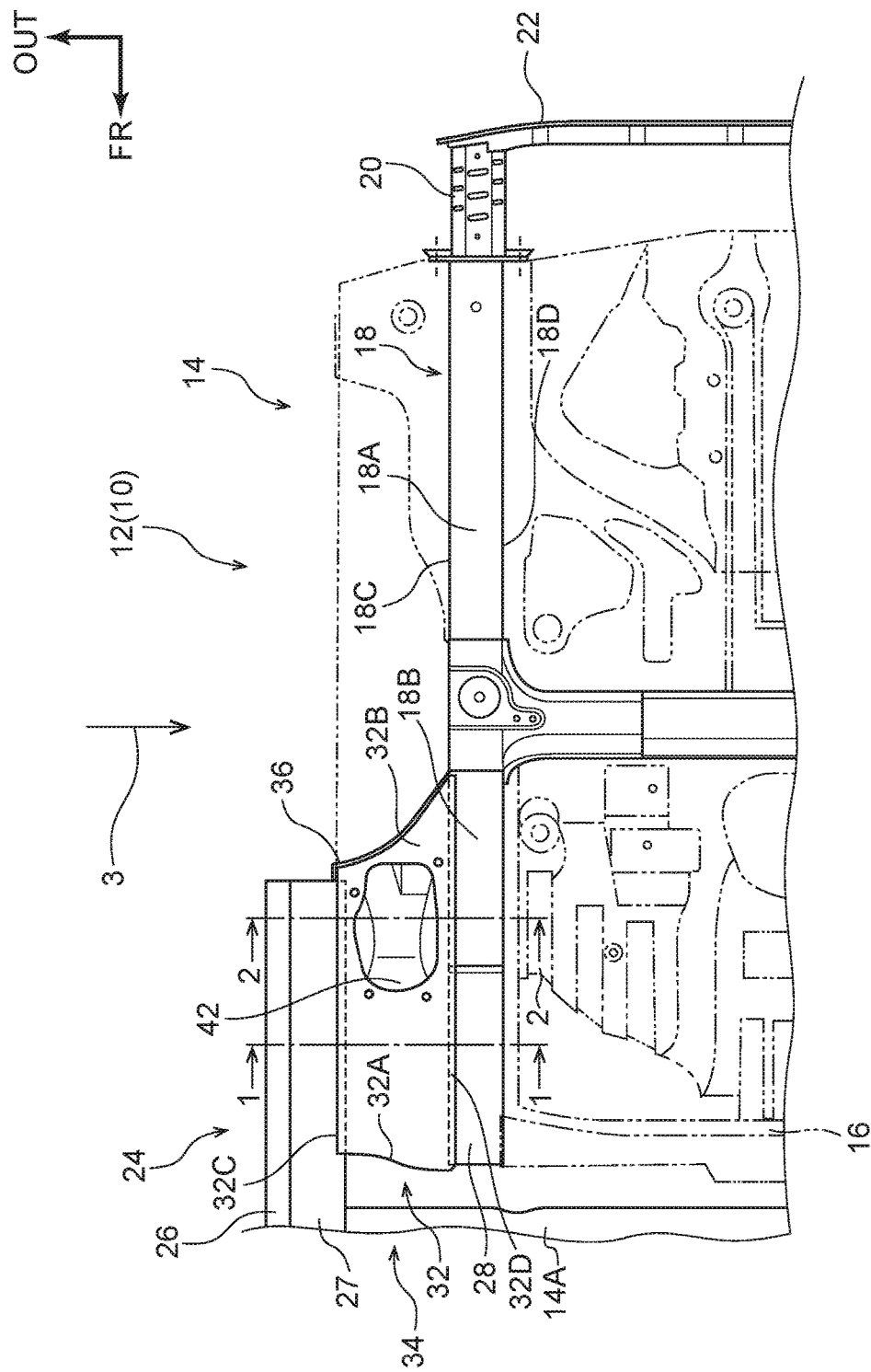
FIG. 4 is a bottom view that is seen from a vehicle lower side and shows the structure of the floor portion of the vehicle to which the vehicle rear portion structure relating to the first embodiment is applied (a view seen in the direction of arrow 4 in FIG. 3)

As shown in FIG. 1 and FIG. 4, the lower panel 32 is structured in the shape of a plate that is trapezoidal and that, as seen from the vehicle vertical direction, has its top side at the vehicle transverse direction outer side, and has its bottom side at the vehicle transverse direction inner side, and that becomes wider from the vehicle transverse direction outer side toward the vehicle transverse direction inner side. Note that end portion 32A at the vehicle front side of the lower panel 32 extends along the vehicle transverse direction, and end portion 32B at the vehicle rear side of the lower panel 32 extends from the rear end portion of the rocker 24 toward the vehicle rear and inner side.

The lower panel 32 is disposed in a state of overlapping the rocker 24 and the rear side member 18 from the vehicle lower sides of the rocker 24 and the rear side member 18. Further, at the lower panel 32, an end portion 32C at the vehicle transverse direction outer side thereof is joined to the vehicle transverse direction inner side peripheral edge portion of the rocker 24, and an end portion 32D at the vehicle transverse direction inner side thereof is joined to the vehicle transverse direction outer side peripheral edge portion of the rear side member 18, at unillustrated joining portions formed by welding or the like, respectively. Moreover, the end portion 32A of the lower panel 32 is joined to a floor wall portion 14A that is provided at the floor portion 14 and extends in the vehicle transverse direction, and the end portion 32B of the lower panel 32 is joined to a rear wheel house 36, at unillustrated joining portions formed by welding or the like, respectively. Note that an insert-through portion 42, into which is inserted the head portion of a shock absorber 40 that structures a portion of a suspension 38, is formed in the lower panel 32.

On the other hand, the upper panel 30 is structured in the shape of a plate whose shape, as seen from the vehicle vertical direction, is basically similar to that of the lower panel 32. The upper panel 30 is disposed in a state of overlapping the rocker 24 and the rear side member 18 from the vehicle upper sides of the rocker 24 and the rear side member 18. At the upper panel 30, an end portion 30A at the vehicle front side thereof is joined to the floor wall portion 14A, and an end portion 30B at the vehicle rear side thereof is joined to the rear wheel house 36, at unillustrated joining portions formed by welding or the like, respectively. Further, an end portion 30C at the vehicle transverse direction outer side of the upper panel 30 is joined to an inner-side side wall portion 24B that structures the vehicle transverse direction inner side portion of the rocker 24, and an end portion 30D at the vehicle transverse direction inner side of the upper panel 30 is joined to the peripheral edge portion at the vehicle transverse direction outer side of the rear side member 18, at unillustrated joining portions formed by welding or the like, respectively. Note that a bulging portion 30E that corresponds to the insert-through portion 42 is formed at the upper panel 30.

Further, in the present embodiment, the closed cross-section structural portion 34 is structured to include the upper panel 30, the lower panel 32, an outer-side side wall portion 18C that structures the vehicle transverse direction outer side portion of the rear side member 18, and the inner-side side wall portion 24B of the rocker 24. This closed cross-section structural portion 34 extends in the vehicle longitudinal direction, and the cross-sectional shape thereof as seen from the vehicle longitudinal direction is a rectangular closed cross-section.

(Operation and Effects of Present Embodiment)

The operation and effects of the present embodiment are described next.

In the present embodiment, the rocker 24 is disposed at the vehicle transverse direction outer side of the floor portion 14 of the vehicle body 12, and the rocker 24 extends in the vehicle longitudinal direction as seen from the vehicle vertical direction. Further, the rear side member 18 is disposed at the vehicle transverse direction inner side of the rocker 24. The front portion 18B of the rear side member 18 is disposed at a position overlapping the rocker 24 as seen in the vehicle transverse direction. On the other hand, the rear portion 18A of the rear side member 18 extends toward the vehicle rear side from the front portion 18B, and extends in the vehicle longitudinal direction as seen from the vehicle vertical direction.

By the way, in a case in which the front portion 18B of the rear side member 18 is a structure that is curved toward the vehicle transverse direction outer side and joined to the rocker 24, it is thought that, when collision load due to a rear collision is inputted to the rear side member 18, a moment due to that collision load will arise at the front portion 18B. Further, it is thought that stress will concentrate at the joined portion of the front portion 18B and the rocker 24 due to the stress that arises due to this moment, and that the fixed state of the rear side member 18 to the rocker 24 will be released.

Here, in the present embodiment, the closed cross-section structural portion 34, which extends in the vehicle longitudinal direction and which has a closed cross-sectional shape seen from the vehicle longitudinal direction, is structured so as to include a portion of the rocker 24 and a portion of the front portion 18B. The closed cross-section structural portion 34 is interposed between the rocker 24 and the front portion 18B. Therefore, the collision load that is due to a rear collision and is inputted to the rear side member 18 can be received by the axial forces of the rear side member 18, the closed cross-section structural portion 34 and the rocker 24, and a moment, which is due to this collision load, being applied between the rear side member 18 and the rocker 24 can be suppressed. Accordingly, in the present embodiment, the fixed state of the rear side member 18 to the rocker 24 being released due to collision load that is due to a rear collision can be suppressed.

Further, in the present embodiment, the rear portion 18A of the rear side member 18 extends rectilinearly in the vehicle longitudinal direction as seen from the vehicle transverse direction, and the front portion 18B of the rear side member extends at an incline with respect to the vehicle longitudinal direction as seen from the vehicle transverse direction. Therefore, a step can be provided at the floor portion 14 of the vehicle body 12.

By the way, in a case in which the rear side member 18 is made to be a structure such as that described above, it is thought that, when collision load due to a rear collision is inputted to the rear side member 18, a bending moment, which bends the rear side member 18 in the vehicle vertical direction, will arise at the inflection point of the front portion 18B and the rear portion 18A.

Here, in the present embodiment, the rocker 24 has the inclined portion 24A, and this inclined portion extends at an incline with respect to the vehicle longitudinal direction so as to overlap the front portion 18B as seen from the vehicle transverse direction. Further, the vehicle vertical direction position of the shear center P1 of the front portion 18B of the rear side member 18 in a cross-section seen from the vehicle longitudinal direction, and the vehicle vertical direction position of the shear center P2 of the inclined portion 24A of the rocker 24 in a cross-section seen from the vehicle longitudinal direction, are set to the same position.

Therefore, as compared with a structure that supports, by only the rear side member 18, the bending moment in the vehicle vertical direction that arises due to collision load that is due to a rear collision, the rear side member 18 bending due to this bending moment can be suppressed in the present embodiment. Accordingly, in the present embodiment, at the time of input of collision load that is due to a rear collision, the rear side member can be supported in a stable state.

Second Embodiment

Figure 5:
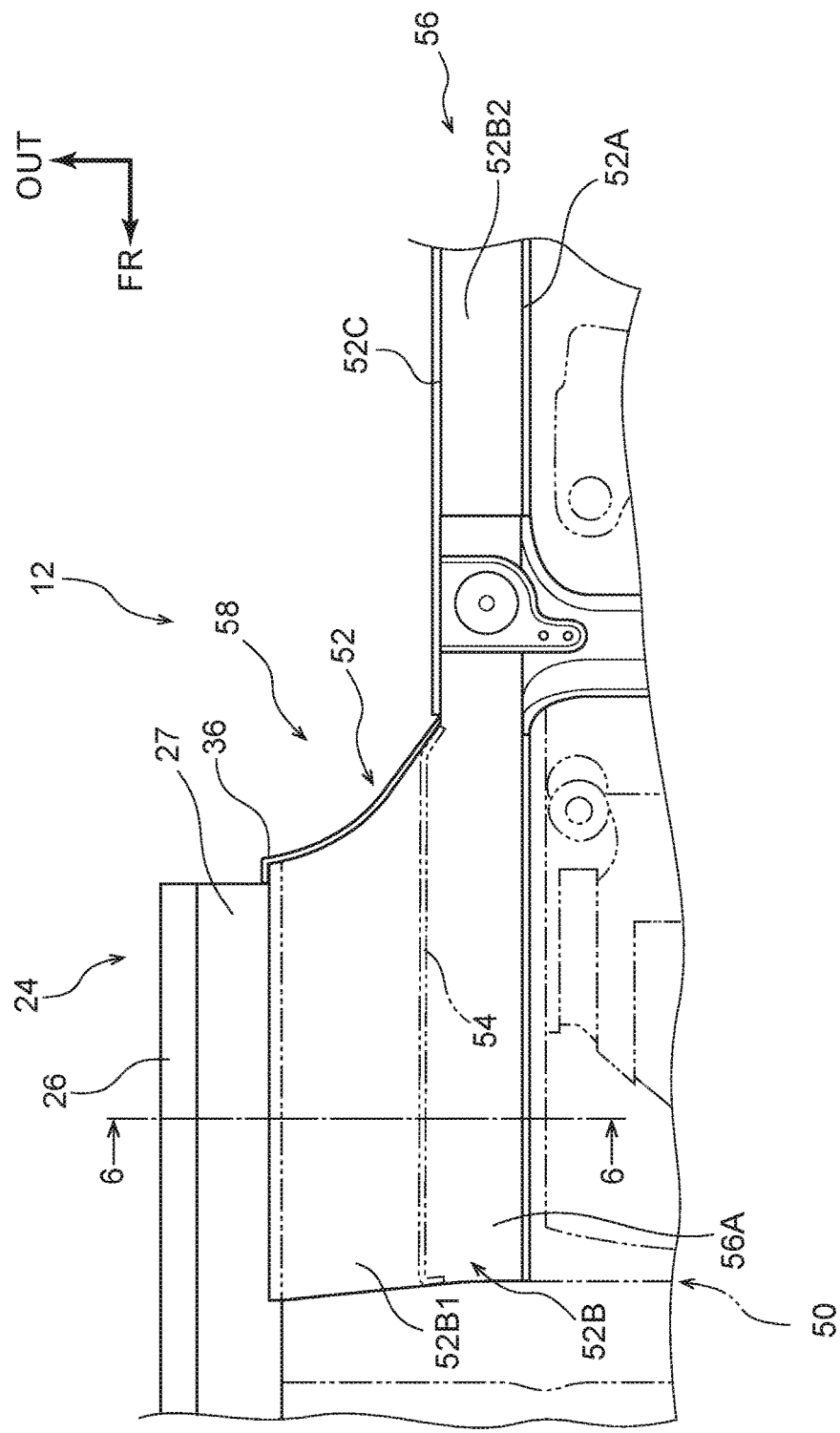
FIG. 5 is a bottom view that is seen from the vehicle lower side and shows the structure of the floor portion of the vehicle to which a vehicle rear portion structure relating to a second embodiment is applied (a bottom view corresponding to FIG. 4)

A second embodiment of a vehicle rear portion structure relating to the present invention is described hereinafter by using FIG. 5 and FIG. 6. Note that structural portions that are same as those of the above-described first embodiment are denoted by the same reference numerals, and description thereof is omitted.

The vehicle rear portion structure relating to the present embodiment has the feature that a "rear side member 56" and a "closed cross-section structural portion 58" are structured to include a "floor panel 50", a "lower panel 52", and a "vertical wall portion 54".

Concretely, in the present embodiment, the floor panel 50 is structured basically similarly to the floor panel 16 of the first embodiment. However, the floor panel 50 extends to the rocker 24, and the vehicle transverse direction outer side end portion of the floor panel 50 is joined to the inner-side side wall portion 24B of the rocker 24 at unillustrated joining portions formed by welding or the like.

Further, the lower panel 52 is structured to include an "inner-side side wall portion 52A" that structures the portion at the vehicle transverse direction inner side of the lower panel 52, a "bottom wall portion 52B" that structures the portion at the vehicle lower side of the lower panel 52, and an "outer-side side wall portion 52C" that is disposed at the vehicle transverse direction outer side of the inner-side side wall portion 52A so as to face this inner-side side wall portion 52A.

The inner-side side wall portion 52A corresponds to the inner-side side wall portion 18D that structures the portion at the vehicle transverse direction inner side of the rear side member 18 in the first embodiment, and extends in the vehicle longitudinal direction with the plate thickness direction thereof being the vehicle transverse direction. Further, the bottom wall portion 52B is structured to include a base portion 52B1 that corresponds to the lower panel 32 of the first embodiment and that is formed in the shape of a plate that is trapezoidal as seen from the vehicle vertical direction, and an extending portion 52B2 that extends toward the vehicle rear side from the base portion 52B1 and is formed in the shape of a plate that is rectangular as seen from the vehicle vertical direction. Moreover, the outer-side side wall portion 52C extends toward the vehicle upper side from the peripheral edge portion at the vehicle transverse direction outer side of the extending portion 52B2, and is formed in the shape of a plate that is rectangular and extends along the vehicle longitudinal direction as seen from the vehicle transverse direction.

At the lower panel 52, the vehicle transverse direction outer side end portion of the base portion 52B1 is fixed by being joined to the peripheral edge portion at the vehicle transverse direction inner side of the rocker 24, the vehicle upper side end portion of the inner-side side wall portion 52A is fixed by being joined to the floor panel 50, and the vehicle upper side end portion of the outer-side side wall portion 52C is fixed by being joined to the floor panel 50, at unillustrated joining portions formed by welding or the like, respectively.

On the other hand, the vertical wall portion 54 is shaped as a plate that extends in the vehicle longitudinal direction with the plate thickness direction thereof being the vehicle transverse direction, and is disposed on a line of extension of the outer-side side wall portion 52C at the vehicle front side of this outer-side side wall portion 52C. At the vertical wall portion 54, the vehicle front side end portion thereof is fixed by being joined to the floor wall portion 14A, the vehicle rear side end portion thereof is fixed by being joined to the rear wheel house 36, the vehicle upper side end portion thereof is fixed by being joined to the floor panel 50, and the vehicle lower side end portion thereof is fixed by being joined to the lower panel 52, at unillustrated joining portions formed by welding or the like, respectively.

Further, in the present embodiment, the rear side member 56 is structured by the inner-side side wall portion 52A, the outer-side side wall portion 52C and the bottom wall portion 52B of the lower panel 52, and by the floor panel 50 and the vertical wall portion 54. Further, the closed cross-section structural portion 58, which extends in the vehicle longitudinal direction and whose cross-sectional shape seen from the vehicle longitudinal direction is a rectangular closed cross-section, is structured by the bottom wall portion 52B of the lower panel 52, the floor panel 50, the vertical wall portion 54, and the inner-side side wall portion 24B of the rocker 24. Namely, in the present embodiment as well, the closed cross-section structural portion 58 is in a state of being interposed between the rocker 24 and the rear side member 56. Note that the vertical wall portion 54 structures a boundary wall portion between a "front portion 56A" of the rear side member 56 and the closed cross-section structural portion 58.

(Operation and Effects of Present Embodiment)

Operation and effects of the present embodiment are described next.

In the present embodiment, the vehicle upper side portions of the rear side member 56 and the closed cross-section structural portion 58 are structured by a portion of the floor panel 50 that is provided at the floor portion 14. On the other hand, the lower panel 52 is disposed at the vehicle lower side of the floor panel 50. Further, the vehicle transverse direction inner side portion of the rear side member 56 is structured by the inner-side side wall portion 52A of the lower panel 52. The vehicle lower side portions of the rear side member 56 and the closed cross-section structural portion 58 are structured by the bottom wall portion 52B of the lower panel 52. Moreover, the vehicle transverse direction outer side portion of a rear portion 56B of the rear side member 56 is structured by the outer-side side wall portion 52C of the lower panel 52.

In addition, in the present embodiment, the vertical wall portion 54, which structures a portion of the front portion 56A and a portion of the closed cross-section structural portion 58 and which structures the boundary wall portion between this front portion 56A and closed cross-section structural portion 58, is disposed on a line of extension of the outer-side side wall portion 52C at the vehicle front side of this outer-side side wall portion 52C as seen from the vehicle vertical direction. Therefore, in the present embodiment, the rear side member 56 and the closed cross-section structural portion 58 can be structured by a common member. As a result, the numbers of members that structure the rear side member 56 and the closed cross-section structural portion 58 can be made to be small.

<Supplementary Description of Above-Described Embodiment>

(1) In the above-described embodiment, a portion that is inclined as seen from the vehicle transverse direction is provided at the rocker and at the rear side member. However, the rocker and the rear side member may be structured so as to extend rectilinearly as seen from the vehicle transverse direction. In accordance with such a structure, the axial forces of the rocker and the rear side member can be used effectively with respect to collision load that is due to a rear collision.

(2) Further, in the above-described embodiment, the vehicle vertical direction position of the shear center of the inclined portion of the rocker, and the vehicle vertical direction position of the shear center of the front portion of the rear side member, are set at the same position. However, the vehicle vertical direction positions of these shear centers may be offset as appropriate in accordance with the structure of the vehicle body 12.

What is claimed is:

1. A vehicle rear portion structure comprising:
a rocker that is disposed at a vehicle transverse direction outer side of a floor portion of a vehicle body, and that extends in a vehicle longitudinal direction as seen from a vehicle vertical direction;
a rear side member that has a front portion, which is disposed at a vehicle transverse direction inner side of the rocker and is disposed at a position overlapping the rocker as seen from a vehicle transverse direction, and a rear portion, which extends from the front portion toward a vehicle rear side and extends in the vehicle longitudinal direction as seen from the vehicle vertical direction; and
a closed cross-section structural portion that is structured to include a portion of the rocker and a portion of the front portion, that is interposed between the rocker and the front portion, that extends in the vehicle longitudinal direction, and that has a closed cross-sectional shape seen from the vehicle longitudinal direction.

2. The vehicle rear portion structure of claim 1, wherein:
the rear portion extends rectilinearly in the vehicle longitudinal direction as seen from the vehicle transverse direction, and the front portion extends at an incline with respect to the vehicle longitudinal direction as seen from the vehicle transverse direction,
the rocker has an inclined portion that extends at an incline with respect to the vehicle longitudinal direction so as to overlap the front portion as seen from the vehicle transverse direction, and
a vehicle vertical direction position of a shear center of the front portion in a cross-section seen from the vehicle longitudinal direction, and a vehicle vertical direction position of a shear center of the inclined portion in a cross-section seen from the vehicle longitudinal direction, are a same position.

3. The vehicle rear portion structure of claim 1, further comprising:
a lower panel that is structured in a shape of a plate that widens from a vehicle transverse direction outer side toward a vehicle transverse direction inner side, and that is disposed in a state of overlapping the rocker and the rear side member from a vehicle lower side; and
an upper panel that is structured in a shape of a plate that widens from a vehicle transverse direction outer side toward a vehicle transverse direction inner side, and that is disposed in a state of overlapping the rocker and the rear side member from a vehicle upper side,
wherein the closed cross-section structural portion is structured by the upper panel, the lower panel, an outer-side side wall portion of the rear side member, and an inner-side side wall portion of the rocker.

4. The vehicle rear portion structure of claim 1, wherein:
vehicle upper side portions of the rear side member and the closed cross-section structural portion are structured by a portion of a floor panel that is provided at the floor portion,
a lower panel, which is structured to include an inner-side side wall portion that structures a vehicle transverse direction inner side portion of the rear side member, a bottom wall portion that structures vehicle lower side portions of the rear side member and the closed cross-section structural portion, and an outer-side side wall portion that structures a vehicle transverse direction outer side portion of the rear portion, is disposed at a vehicle lower side of the floor panel, and
a vertical wall portion, which structures a portion of the front portion and a portion of the closed cross-section structural portion and which structures a boundary wall portion of the front portion and the closed cross-section structural portion, is disposed on a line of extension of the outer-side side wall portion at a vehicle front side of the outer-side side wall portion as seen from the vehicle vertical direction.

* * * * *